United States Patent
Zettl et al.

(10) Patent No.: US 7,515,010 B2
(45) Date of Patent: Apr. 7, 2009

(54) NANOSCALE RELAXATION OSCILLATOR

(75) Inventors: Alexander K. Zettl, Kensington, CA (US); Brian C. Regan, Los Angeles, CA (US); Shaul Aloni, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 393 days.

(21) Appl. No.: 11/245,652

(22) Filed: Oct. 6, 2005

(65) Prior Publication Data
US 2006/0118782 A1 Jun. 8, 2006

Related U.S. Application Data

(63) Continuation of application No. 11/085,397, filed on Mar. 21, 2005, now Pat. No. 7,341,651, and a continuation of application No. 11/229,935, filed on Sep. 19, 2005.

(60) Provisional application No. 60/617,583, filed on Oct. 8, 2004.

(51) Int. Cl.
*H03B 5/30* (2006.01)
(52) U.S. Cl. .................. 331/187; 977/725; 977/962
(58) Field of Classification Search .......... 331/94.1, 331/154, 187; 977/723, 725, 962
See application file for complete search history.

(56) References Cited

U.S. PATENT DOCUMENTS

| | | | |
|---|---|---|---|
| 5,641,466 A | 6/1997 | Ebbesen et al. | |
| 6,911,132 B2 | 6/2005 | Pamula et al. | |
| 7,163,612 B2 | 1/2007 | Sterling et al. | |

OTHER PUBLICATIONS

Regan et al., "Carbon nanotubes as nanoscale mass conveyors", Nature, vol. 428, pp. 924-927, Apr. 29, 2004.*
Cho, et al., "Creating, Transporting, Cutting, and Merging Liquid Droplets by Electrowetting-Based Actuation for Digital Microfluidic Circuits," *J. Microelectromech. Systems*, vol. 12, No. 1, pp. 70-80 (2003).

(Continued)

*Primary Examiner*—Robert Pascal
*Assistant Examiner*—Levi Gannon
(74) *Attorney, Agent, or Firm*—Joseph R. Milner; Lawrence Berkeley National Laboratory

(57) ABSTRACT

A nanoscale oscillation device is disclosed, wherein two nanoscale droplets are altered in size by mass transport, then contact each other and merge through surface tension. The device may also comprise a channel having an actuator responsive to mechanical oscillation caused by expansion and contraction of the droplets. It further has a structure for delivering atoms between droplets, wherein the droplets are nanoparticles. Provided are a first particle and a second particle on the channel member, both being made of a chargeable material, the second particle contacting the actuator portion; and electrodes connected to the channel member for delivering a potential gradient across the channel and traversing the first and second particles. The particles are spaced apart a specified distance so that atoms from one particle are delivered to the other particle by mass transport in response to the potential (e.g. voltage potential) and the first and second particles are liquid and touch at a predetermined point of growth, thereby causing merging of the second particle into the first particle by surface tension forces and reverse movement of the actuator. In a preferred embodiment, the channel comprises a carbon nanotube and the droplets comprise metal nanoparticles, e.g. indium, which is readily made liquid.

32 Claims, 4 Drawing Sheets

OTHER PUBLICATIONS

Darhuber, "Microfluidic actuation by modulation of surface stresses," *Appl. Phys. Lett.*, vol. 82, No. 4, pp. 657-659, (2003).

D'Innocenzo, et al., "Modeling leaky faucet dynamics," *Phys. Rev. E*, vol. 55, No. 6, pp. 6776-6790, (1997).

Eggers, et al., "Coalescence of liquid drops," *J. Fluid Mech.*, vol. 401, pp. 293-310, (1999).

Koch, et al., "Modelling of HREM and nanodiffraction for dislocation kinks and core reconstruction," *J. Phys.*, vol. 12, pp. 10175-10183, (2000).

Lee, et al., "Surface-Tension-Driven Microactuation Based on Continuous Electrowetting," *J. Microelectromech. Systems*, vol. 9, No. 2, pp. 171-180, (2000).

Li, et al., "Self-Similar Chain of Metal Nanospheres as an Efficient Nanolens," *Phys. Rev. Lett.*, vol. 91, No. 22, pp. 227402-1-227402-4, (2003).

Maboudian, et al., "Adhesion in surface micromechanical structures," *J. Vac. Sci. Technol. B*, vol. 15, No. 1, pp. 1-20, (1997).

McCelland, et al., "Surface tension and density measurements for indium and uranium using a sessile-drop apparatus with glow discharge cleaning," *Surface Sci.*, vol. 330, pp. 313-322, (1995).

Pollack, et al., "Electrowetting-based actuation of liquid droplets for microfluidic applications," *Appl. Phys. Lett.*, vol. 77, No. 11, pp. 1725-1726, (2000).

Pollack, et al., "Electrowetting-based actuation of droplets for integrated microfluidics," *Lab Chip*, vol. 2, pp. 96-101, (2002).

Regan, et al., "Nanowicks: Nanotubes as Tracks for Mass Transfer," Molecular Nanostructures, Kuzmany, Fink, Mehring, Roth eds. AIP Conference Proceedings 685, 612, (2003).

Sazonova, et al., "A tunable carbon nanotube electromechanical oscillator," *Nature*, vol. 431, pp. 284-287, (2004).

Syms, et al., "Surface Tension-Powered Self-Assembly of Microstructures—The State-of-the-Art," *J. Microelectromech. Systems*, vol. 12, No. 4, pp. 387-417, (2003).

Tas, et al., "Scaling Behaviour of Pressure-Driven Micro-Hydraulic Systems," *Nanotech*, vol. 1, Tech. Proc. Of the 2002 International Conf. on Modeling and Simulation of Microsystems, Chapter 3, (2002).

Tas, et al., "Nanofluidic Bubble Pump Using Surface Tension Directed Gas Injection," vol. 74, pp. 2224-2227, (2002).

Tseng, et al., "A High-Resolution High-Frequency Monolithic Top-Shooting Microinjector Free of Satellite Drops—Part I: Concept, Design, and Model," *J. Microelectromech. Systems*, vol. 11, No. 5, pp. 427-436, (2002).

Velev, et al., "On-chip manipulation of free droplets," *Nature*, vol. 426, pp. 515-516, (2003).

Zettl, "Non-Carbon Nanotubes," *Adv. Mater.*, vol. 8, No. 5, pp. 443-445, (1996).

\* cited by examiner

NANOSCALE RELAXATION OSCILLATOR

CROSS-REFERENCE TO RELATED APPLICATIONS

This application claims benefit of Provisional Patent Application Ser. No. 60/617,583 filed Oct. 8, 2004, patent application Ser. No. 11/085,397, filed Mar. 21, 2005, by the same inventors, entitled "Nanoscale Mass Conveyor," and patent application Ser. No. 11/229,935 filed Sep. 19, 2005 entitled "Nanocrystal Powered Nanomotor," also naming the same inventors. These applications are hereby incorporated by reference into the present application.

STATEMENT OF GOVERNMENTAL SUPPORT

This invention was made during work supported by U.S. Department of Energy under Contract No. DE-AC02-05CH11231 and National Science Foundation Grant CCR 0210176. The government has certain rights in this invention.

REFERENCE TO SEQUENCE LISTING OR COMPACT DISK

NONE

BACKGROUND OF THE INVENTION

1. Field of the Invention

The present invention relates to the field of nanostructures, to oscillators, and to the application of mass transport and hydrodynamic effects to create oscillatory movement on a nanoscale.

2. Related Art

The relative importance of different forces is scale dependent (Ref. 1). For instance, human beings cannot carry twenty times their own weight, nor walk on water. Yet insects having such abilities are well known (Refs. 2, 3). The explanation lies in the relative scaling of mass, muscle strength, and surface tension with the length scale s. Thus, relative to weight ($\sim s^3$), muscle strength ($\sim s^2$) and surface tension ($\sim s$) are one thousand and one million times more effective respectively for insects than for humans because of the thousand-fold difference in linear length scale. As the relevant size scale decreases, the relatively feeble scaling of surface tension makes it progressively more important. In the micrometer and nanometer regimes this force can dominate.

Though often an impediment (Refs. 4-7), surface tension has been utilized in some synthetic microsystems. For instance, electric field-induced changes in surface tension (electrowetting) are used to transport and manipulate droplets in microfluidic systems (Refs. 8, 9).

Reference (8) discloses that a mercury drop in a glass capillary tube can be moved by an electrochemical effect called electrocapillarity. A potential is applied across the interface between the liquid metal and the capillary. The liquid metal is contained in an electrolyte, across which a voltage gradient is applied, causing movement of the metal through the tube.

Reference (9) discusses the application of chemical electrowetting using a surface covered with dielectrics. It is suggested that a digital microfluidic circuit could be created in which droplets are created from a reservoir, transported, cut and merged by electrowetting. With the appropriate design of channels, electrodes and control circuits, a total microfluidic analysis system could be built.

Microscale, surface tension-based bubble valves and pumps have been developed for commercially available ink-jet printers and lab-on-a-chip implementations (Refs. 10, 11). A MEMS technology (Ref. 12) for three-dimensional assembly uses the surface tension forces created by melting precisely-sized metal pads to rotate released structures off of the substrate plane.

Reference (12) discusses surface tension as a means for carrying out the assembly of microstructures. In one arrangement, the surface tension holding a droplet to a solid, hinged surface is used to rotate the hinge portion. A solder pad is placed across the hinge, and, when melted, causes the hinge to lift up to adhere to the liquid droplet. A procedure to form electrical networks by self assembly is also disclosed (FIG. 20 of Ref. 12).

The degree to which surface tension is exploited by these approaches is limited, however. In the case of electrowetting, the surface tension effect is differential and thus requires high voltage to access relatively moderate forces. In the other cases, the surface tension action is inherently unidirectional.

Pollack et al., "Electrowetting-based actuation of droplets for integrated microfluidics, Lab Chip 2:96-101 (2002) describes the micromanipulation of discrete droplets of aqueous electrolyte by electrowetting. A series of electrodes are used to control drop merging and splitting.

Tas et al., "Scaling Behavior of Pressure-Driven Microhydraulic Systems," Nanotech 2002 Vol. 1, Technical Proceedings of the 2002 International Conference on Modeling and Simulation of Microsystems, Chapter 3 (2002) discloses a hydraulic relaxation oscillator that was fabricated on silicon glass. Various hydraulic devices were created to recreate, for fluid flow, various properties of electrical flow. For example, a flow restriction was characterized as a "resistor," and other devices were created to act as fluid "capacitors." Assembling these in a fluid circuit resulted in the creation of a relaxation oscillator.

Darhuber et al. "Microfluidic Actuation by Modulation of Surface Stresses, App. Phys. Lett. 82(4):657-659 (Jan. 2003) discloses a microfluidic device that can be used to manipulate nanoliter liquid samples. The device uses hydrophilic lanes and specific heating elements.

Velev et al. "On Chip Manipulation of Free Droplets," Nature 426:515-516 (Dec. 2003) discloses a dielectrophoretic transporter for moving droplets suspended in oil by timed switching of a series of electrodes.

Another type of nanoscale oscillator is described in Sazonova et al. "A Tunable Carbon Nanotube Electromechanical Oscillator," Nature 431:284-287 (16 Sep. 2004). This publication describes a nanotube grown over a trench between two metal (Au/Cr) electrodes. Nanotube motion is caused by interaction with a gate electrode at the bottom of the trench.

A device that fully realizes surface tension's great advantages should be nanoscale, where surface tension is strongest relative to other forces, and involve a controllable, reciprocating mechanical action. Described below is the utilization of surface tension forces in a nanoelectromechanical relaxation oscillator. Relaxation oscillators, which relate to such diverse phenomena as heartbeats (Ref 13), leaky faucets (Ref 14) and earthquakes (Ref 15), are generically characterized by two distinct time scales: a fast relaxation phase and a slow recovery phase. In our oscillator implementation, the fast relaxation is a hydrodynamic event driven by surface tension. The slow portion of the oscillator cycle is electrically driven and involves atom-by-atom transport, or "mass transport." (Ref 16). By avoiding hydrodynamic transport during the slow half-cycle, direct confrontation between the electrical and surface tension forces is circumvented. Thus this device accesses the full strength of the surface tension forces during relaxation, yet only requires low voltages for operation.

BRIEF SUMMARY OF THE INVENTION

The present invention relates to a mechanical relaxation oscillator device operating on a nanometer scale, as referred to in the preceding paragraph. The oscillator generates a physical, i.e. mechanical, oscillation by virtue of two nanoscale particles of a diffusing (e.g. chargeable) material connected by a channel for conducting atomic mass transfer and for supporting particle growth.

The particles are also sometimes referred to herein as "droplets." Preferably, they are liquid at no more than a slightly elevated temperatures (below 200° C.). It is also preferred that the material to be transported between droplets have a low vapor pressure near its melting point, otherwise material might be lost. The particles which provide the transport material are comprised of chargeable atoms in order to be moved by the voltage. They are preferably comprised of a metal such as indium, thallium, gallium, tin, titanium, lead, mercury, gold, silver, aluminum, platinum, copper, or mixtures thereof. The particles may also comprise various additives and/or reporter molecules. Essentially, they must be "fluid particles" in order to take advantage of the force of surface tension during the fast, relaxation stage. That is, the term "chargeable" is used in a broad sense to include a particle that moves in response to a potential gradient. The potential gradient may be electric, magnetic, electromagnetic, chemical or thermal.

The channel may be a nanotube (single or multiwalled carbon), nanorod, wire, or a quasi-one dimensional path on a two-dimensional surface that is defined by chemical or physical means (i.e. by treating the surface to create a barrier to unconstrained two-dimensional surface diffusion). The channel preferably has a diameter less than 200 nanometers and a length at least ten times its diameter (a condition referred to as "quasi-one dimensional," in that the aspect of length greatly exceeds width or diameter). The channel serves the functions of supporting the droplets and conducting charged particles from one droplet to the other by atomic mass transport. The channel may also carry an electric current and provide heat to the droplets. The channel may exhibit optimum properties with a length between 10 microns and 10 nanometers and a diameter (in the case of a nanotube) between 0.5 nm and 100 nm. In order for mass transport to occur along the channel, it is necessary that the channel be sufficiently warm, and that an electric field can be applied to the particles. In the case where these two requirements are simultaneously achieved by establishing a current through the channel, it is preferred that the channel will generally carry a current of 20-100 microamperes In addition to the channel, another element, termed generically an actuator, may be coupled to the oscillation of a droplet. Because the smaller droplet essentially disappears, the actuator should contact the larger droplet. The actuator transmits the oscillation that results from the changing sizes of the droplets to a higher order device. The actuator may be another nanotube in movable contact with the droplet, or it may be a small piece of metal in which the oscillation causes changes in the frequency of reflected light, or current changes, or it may be the end of a tube that receives pressure changes, or opens and closes in response to the droplet's growth and sudden shrinkage. In one embodiment, the actuator is the channel (nanotube) itself, in that the movement of the particles causes flexure (longitudinal bending) of the nanotube. In another embodiment, the channel is formed in a silicon substrate that is etched to provide a hinged actuator portion within the silicon substrate.

The oscillatory movement of the droplet may be utilized without a physical actuator structure. The oscillator may be comprised in a device in which electromagnetic radiation (infrared, visible light, radio frequencies, X-rays, etc.) or other wave energy (e.g. acoustic) is generated by, or modified by the oscillatory movement provided by the present device. Thus the actuator may comprise a carbon nanotube, hinged silicon, electromagnetic radiation, and sound waves. The sound can be coupled out through the substrate, as opposed to through the surrounding air/gas. The oscillator may be designed using principles based on sound wave phonons.

In operation, the device may further comprise electronics (i.e. an electrical source) for creating a voltage differential across the droplets. In a preferred embodiment, an electrode is attached to one end of the channel with a counter-electrode attached to another end of the channel. In another embodiment, the electrodes may be connected to a dielectric medium surrounding the droplets. The electrodes are attached to a voltage source, whereby the device transports the atoms along the channel towards an electrode and, therefore, from one particle to another. The rate of transport is determined by the voltage, which may be altered to change oscillatory frequency or to set a particular oscillatory frequency. An advantage of the present device is that significant mechanical force can be produced with a voltage that need only be between 1 and 5 volts. The voltage can range higher, up to 10 or even 100 volts, if desired. The oscillations caused by droplet growth/shrinkage can be extremely slow, or up to 1 gigahertz. Higher frequencies can be extracted from the primary mechanical oscillations, because the frequency is a complex formation (i.e. a sawtooth pattern) that can be filtered into higher frequency components. The oscillating output can be accomplished without reversing or otherwise modulating the voltage, thus facilitating the fabrication of a complete nanoscale device that is powered by a simple, non-modulating power output, such as a simple battery or solar cell connected directly to the electrodes.

Other components may be used to create a potential gradient along the channel that will drive mass transport. These may include different compositions that have chemical gradients, the presence of strain in the material, heating elements for thermal diffusion, and magnets creating a charged field for electromigration.

In operation, the present device causes oscillation by two mechanisms: atomic mass transport in the slow (recovery) phase, and surface tension in the fast (relaxation) phase. Surface tension causes the two droplets to essentially merge, with a marked reduction in size of the smaller droplet. In the recovery phase, the droplets are grown together by atomic mass transport. The atomic mass transport moves atoms from a larger droplet to a nearby (approximately 100 nm from center to center away) smaller droplet. The smaller droplet grows faster than the larger droplet shrinks, so that eventually the two droplets come into contact. Upon contact, surface tension causes the smaller droplet, which had been growing is size, to suddenly shrink. Thus the oscillations are not of a sinusoidal pattern, but, produce a wave form with a fast component and a slow component.

This oscillator is ideal for locomotive applications, since it is so powerful for its size. For instance, in a nanobot it could be used as the motor that drives crawling, walking, swimming, jumping, or flying. The time asymmetry between the slow mass transfer and fast, surface-tension-driven relaxation event actually helps in these applications, because stick-slip motion (e.g crawling) and vortex propulsion (e.g. swimming, flying the way a fly does it) require such an asymmetry.

DETAILED DESCRIPTION OF THE PREFERRED EMBODIMENT

Definitions

Figure 1:
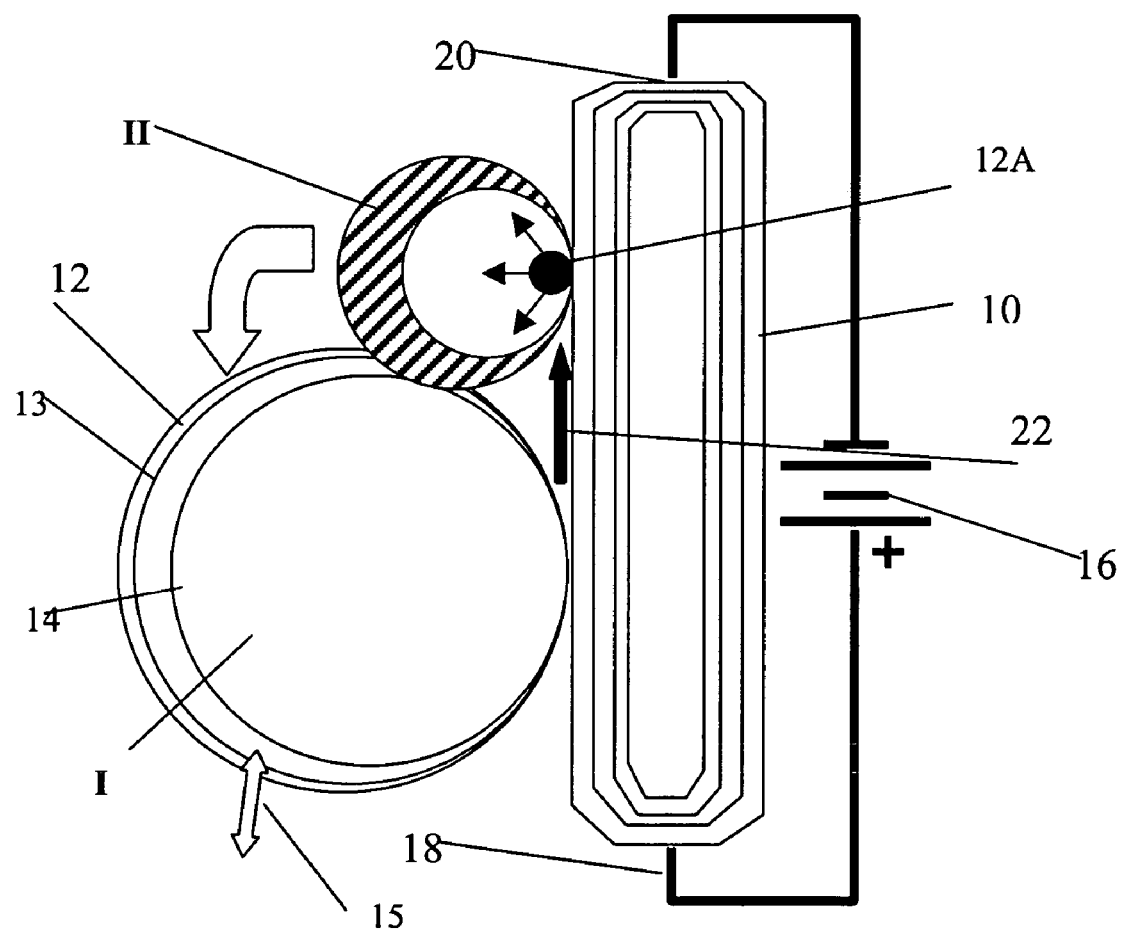
FIG. 1 is a schematic drawing of a mechanical relaxation oscillator according to the present invention, illustrating droplets I and II.

The term "channel" is used herein in its most general sense. It is intended to cover nanotubes (single or multiwalled, made of various materials such as carbon or boron nitride), nanorods, nanowires, quasi-one dimensional paths on two-dimensional surfaces that are defined by chemical or physical means (i.e. by treating the surface to create a barrier to unconstrained two-dimensional surface diffusion), and the like. A silicon wafer may be etched with a fine groove to provide the present channel. The channel is essentially atomically smooth, as that term is understood in the field of material science. As used herein, and generally understood in the art, "atomically smooth" means lacking in contaminants, imperfections or other barriers, cavities or defects that disrupt an ordered atomic structure that would provide an extremely smooth surface. A discussion of atomic smoothness is found in Koch et al., "Modelling of HREM and nanodiffraction for dislocation kinks and core reconstruction," J. Phys.: Condens. Matter 12:10175-10183 (2000). The term "atomically smooth" refers, in the context of the present device, to the ability of a channel in a device according to the present invention to transport atoms along the channel, without the atoms (or clusters of atoms) being lost, diverted, or stuck on the channel.

The term "chargeable" means that a material exhibits physical motion in response to an applied gradient. e.g. voltage. A "chargeable" atom may be ferromagnetic, metallic, or a solution or suspension containing a biological molecule capable of exhibiting charged behavior (e.g. migration though an electrophoretic gel). The property of being "chargeable" is exemplified by metals such as indium, thallium gallium, tin, titanium, lead, mercury, gold, silver, aluminum, platinum or copper, or alloys containing these metals. Biological molecules such as DNA, organic molecules, polymers, amino acids, peptides, carbohydrates and proteins also exemplify this property, as evidenced by their migration in gel electrophoresis.

The term "ferromagnetic," referred to above, means noting or pertaining to a substance, as iron, that below a certain temperature, the Curie point, can possess magnetization in the absence of an external magnetic field; noting or pertaining to a substance in which the magnetic moments of the atoms are aligned.

The term "atoms" is used in its most general sense to refer to atoms, molecules, or clusters (preferably less than 10 atoms) or molecules. "Atoms" to be transported are supplied by a "source" particle, which may contain many millions of "atoms".

The source particles ("droplets") of atoms in the present invention are preferably, at their largest growth, between 1 and 1,000,000 nm in diameter, preferably between 5 and 100 nm in diameter.

The term "mass transport" means that atoms are moved at a very small scale, mostly individually (as in surface diffusion), rather than in group (as in a droplet or stream that moves according to the laws of hydrodynamic flow). Because of chargeable properties of certain atoms used, the mass transport moves atoms along the channel away from the electrode and towards the counter electrode according to the combination of the channel temperature and the applied electric field. Sufficiently high temperature is required to make the atoms mobile, and the electric field (generated by the applied voltage) is required to direct the motion of the atoms one way or the other along the channel.

The term "electrical source" means a voltage source, a current source or a combination of the two. That is, an ideal current source will provide the specified current into any load. An ideal voltage source will provide the specified voltage across any load. However, current sources fail (i.e. become non-ideal) when the resistance of the load gets too high (device can not generate sufficient voltage). Voltage sources fail when the resistance of the load gets too low (device can not supply sufficient current). Of course, a real current source provides voltage, and a real voltage source provides current, thus being a combination voltage/current source. But the distinctions make above are relevant and may be reflected in the design of the corresponding devices. Therefore, as described below, mass transport may be accomplished by a voltage source, a current source, or both.

Generalized Method and Apparatus

The preferred channel is a multiwalled carbon nanotube (MWNT). These nanotubes have a near perfect carbon tubule structure that resembles a sheet of $sp^2$ bonded carbon atoms rolled into a seamless tube. They are generally produced by one of three techniques, namely electric arc discharge, laser ablation and chemical vapor deposition. The arc discharge technique involves the generation of an electric arc between two graphite electrodes, one of which is usually filled with a catalyst metal powder (e.g. iron, nickel, cobalt), in a helium atmosphere. The laser ablation method uses a laser to evaporate a graphite target which is usually filled with a catalyst metal powder too. The arc discharge and laser ablation techniques tend to produce an ensemble of carbonaceous material which contains nanotubes (30-70%), amorphous carbon and carbon particles (usually closed-caged ones). The nanotubes must then be extracted by some form of purification process before being manipulated into place for specific applications. The chemical vapor deposition process utilizes nanoparticles of metal catalyst to react with a hydrocarbon gas at temperatures of 500-900° C. A variant of this is plasma enhanced chemical vapor deposition in which vertically aligned carbon nanotubes can easily be grown. In these chemical vapor deposition processes, the catalyst decomposes the hydrocarbon gas to produce carbon and hydrogen. The carbon dissolves into the particle and precipitates out from its circumference as the carbon nanotube. Thus, the catalyst acts as a 'template' from which the carbon nanotube is formed, and by controlling the catalyst size and reaction time, one can easily tailor the nanotube diameter and length respectively to suit. Carbon tubes, in contrast to a solid carbon filament, will tend to form when the catalyst particle is ~50 nm or less because if a filament of graphitic sheets were to form, it would contain an enormous percentage of 'edge' atoms in the structure.

Other forms of nanotube may be used, so long as they have uniform mechanical properties and are chemically inert to the atoms that are to be transported. For example, BC2N or BN nanotubes, as described in Zettl, "Non-Carbon Nanotubes," Adv. Mat. 8(5):443-445 (1996). Nanotubes in the general sense of a channel may be formed intrinsically within a substrate by known techniques to cause an atomic ordering of atoms (e.g. carbon, silicon, boron) within the substrate to define a graphite-like ordered structures regularly covalently bonded as in the MWNT $sp^2$ structure.

Other forms of channel may be employed. An etched, appropriately doped silicon chip can be used to hold two droplets of unequal size with an etched, conductive groove between them. It is important that the channel be atomically smooth, as described above.

FIG. 1: Apparatus Diagram

FIG. 1 schematically depicts a relaxation oscillator mechanism according to the present invention. Two metal particles ("droplets") are located adjacent to one another on a carbon nanotube substrate. The particles are indicated throughout the various figures by Roman Numerals I and II.

The particles must be of different sizes, and should be below 1 μm. They may be as large as 1 mm and still function as described with the presently employed surface tension/electronic effects without larger order forces such as gravity and friction interfering.

The particles are attached to a multi-walled nanotube (MWNT) 10. Driving electrical current through the substrate is accomplished by a DC voltage source 16, connected to opposite ends of the MWNT 10 by electrodes 18 and 20. This charge and resultant current initiates an atomic mass transport process along the nanotube, indicated by arrow 22. This causes movement of atoms of metal from the droplet at site I to the one at site II. The changes in sizes of the droplets are indicated by different diameters. Droplet I begin at diameter 12, gradually shrinking to diameter 13, then diameter 14. Contrariwise, particle II begins at a small diameter 12A, then gradually expands. It expands proportionately faster than droplet at I shrinks, so when droplet I is at diameter 14, droplet II has grown to a size where the surface of droplet I touches the surface of droplet II. When droplet II becomes large enough to touch the shrinking, but still larger, droplet I, the reciprocal growth/shrinkage of the two droplets is no longer driven by mass transport. At the point of contact between the droplets, the fast phase of the relaxation oscillator cycle begins. Growing the smaller droplet II at the larger droplet I's expense is unfavorable from a surface energy standpoint(17). Thus, when a hydrodynamic channel is created by the physical contact of the two droplets, the oscillator transitions from the metastable state. Droplet I consumes its offspring, and the process begins anew. The key advantage of using the process reported in (16) is that the recovery transport is atomic, not hydrodynamic. By moving atoms individually, via directed surface diffusion, the collective surface energy can be accumulated piecemeal, then rapidly released during the relaxation phase.

Changes in size of the larger droplet I may be transmitted to an actuator 15 that may be associated with the droplet. The actuator 15 may be attached to either or both droplets, but prefereably is associated with droplet I. It may be a support used to effectuate locomotion; a ratchet attached to a gear; a mechanical or an optical switch. The actuator may be another nanotube or a hinged member of a substrate. The expanding/contracting droplet may also be used to modulate the frequency of electromagnetic radiation incident on the droplet. In this case, the "actuator" may be regarded as a beam of radiation, e.g. light or an rf signal, that is reflected from the expanding/contracting droplet. The present oscillations may be accelerated to high frequencies by placement and sizing of the droplets. The frequencies that can be extracted from the oscillations of the present device may be as high as 10 terahertz. By oscillating the size of the larger droplet, a Doppler shift in the reflected light may be plus or minus up to one gigahertz as a result of movement of the droplet towards or away from the incident radiation. Thus the present oscillator may be used as a frequency shifter in an rf circuit.

The actuator may be a nanoscale structure, electromagnetic radiation, or sound waves. The nanoscale structure may be hinged silicon, a nanotube, a nanowire, an insulating material, a semiconductor material, a metal material, a silicon material, a silicon nitride material or a gallium arsenide material. Thus the movement shown by arrow/actuator 15 may be transmitted to a physical structure, which will move in response to the oscillating growth and shrinkage of the particle labeled "Droplet I", changing diameter as shown in FIG. 1 through diameters 12, 13 and 14.

Also, by oscillating the size of a metal droplet, a nanolens may be created, as described in Li et al. "Self-Similar Chain of Metal Nanospheres as an Efficient Nanolens," Phys. Rev. Lett. 91(22):227402-1-227402-4 (November 2003).

Another embodiment involves the use of the present device as a timing device. For example, particle size oscillations can be used to maintain the frequency of a clock signal.

Figure 2:
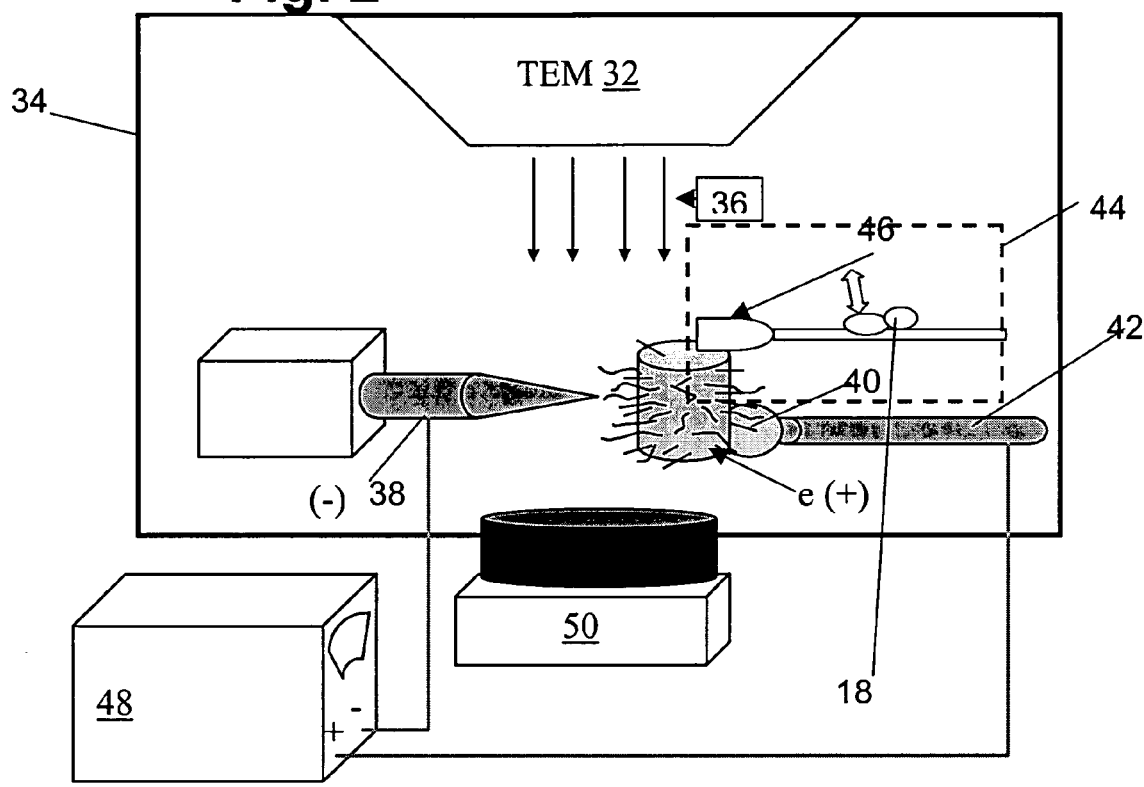
FIG. 2 is a schematic diagram of a presently preferred arrangement for constructing the present relaxation oscillator.

FIG. 2: Construction of a Device

A. MWNTs

MWNTs were synthesized by the standard arc technique as described in Ebbesen et al. U.S. Pat. No. 5,641,466 issued Jun. 24, 1997, hereby incorporated by reference to describe a method for large-scale synthesis of carbon nanotubes. In an inert gas at a pressure of 200-2500 torr, an arc discharge is made between two carbon rod electrodes by application of a suitable AC or DC voltage (e.g. about 18 V) to thereby produce a carbon plasma. The electric current is about 50-100 A. As the result a carbon deposit forms on the end of one of the two carbon rods, and a core part of the carbon deposit contains a large amount of carbon nanotubes. This core part can easily be separated from a shell part in which no carbon nanotubes exist. Usually carbon nanotubes occupy more than 65 wt % of the core part of the deposit, and the nanotubes coexist with some (less than 35 wt %) carbon nanoparticles which are nanometer-scale carbon particles with polyhedral cage structures. Sometimes a small amount of amorphous carbon also coexists.

B. Application of Nanoparticles

The nanotube-containing boule was next decorated with indium particles. The sample was lowered into a standard thermal evaporation device comprising a heated chamber that is placed under vacuum. The sample was suspended above a molybdenum "boat" containing indium. The vaporized indium condensed on nanotubes in the sample.

After the nanotube-containing sample was mounted in a thermal evaporator, the evaporation chamber was evacuated to a pressure of 2 microtorr or less. Indium metal of better than 99% purity was then thermally evaporated onto the sample.

The amount of indium metal evaporated corresponded to a uniform thickness of 25 nm, as determined by an in situ crystal thickness monitor. However, because of the wetting properties of indium on MWNTs, the morphology of the indium film was that of discrete particles rather than a layer with continuous coverage.

C. Assembly of the Oscillator

The relaxation oscillator was constructed and operated inside a high-resolution transmission electron microscope (TEM), specifically a JEOL FASTEM 2010 obtainable from JEOL USA, Peabody, Mass., with a custom-built nanomanipulation stage (described below). Raw materials for the oscillator were first prepared ex-situ by decorating arc-grown MWNTs with indium nanoparticles via thermal evaporation. The decorated MWNTs were then mounted on the nanomanipulation stage and inserted into the TEM, where the oscillator configuration of FIG. 1 is created in situ. Using the nanomanipulator, an electrical connection was made to a nanotube having two indium particles on it, as shown in the TEM images in FIG. 3. It would also be possible to place a MWNT in contact with one droplet so as to be moved by the mass transport and surface-tension size changes of a droplet. By applying a voltage across the MWNT channel with external electronics, an electrical current is established through the channels and the junction.

The coated sample was then attached to a thin wire and fixed to the sample side of the TEM stage. The sample is shown in an expanded view in insert 44. The sample is shown attached to Pt/Ir wire 42 (Platinum 90% Iridium 10% wire, 12 mil. diameter) through a small drop of silver paint 40. As can be seen in the expanded view, the first nanotube is adjacent to a second nanotube as described in connection with FIG. 1, with a metal droplet 18 adjacent a second droplet, both sitting on a nanotube channel, with the droplet 18 contacting an actuator, such as another nanotube, to be moved by the oscillation.

The TEM 32 used to assemble and observe the device emits ~200 keV electrons as shown at 36. The wire 42 holding the sample is in turn attached to a standard sample holder in the stage area 34. A nanomanipulator 38 also was extended into the stage area 34 for assembly. The nanomanipulator 38 is capable of nanoscale movements by virtue of electronically controlled piezoelectric crystals that deliver small vibrations to a moveable tip (shaded in FIG. 3). The nanomanipulator was obtained from Nanofactory Instruments AB, Walleriusgatan 2, SE 412 58 Göteborg, Sweden. The tip can be manipulated forwards, backwards, up or down in tiny increments. It is viewed through the TEM 32 and positioned so that a freshly etched, fine tungsten tip is in contact with a selected nanotube that has an appropriate arrangement of metal particles and adjacent nanotube. The tip and the sample are connected to a controllable voltage source 48. The manipulations can be recorded on a CCD camera 50 that records the TEM images.

Figure 3:
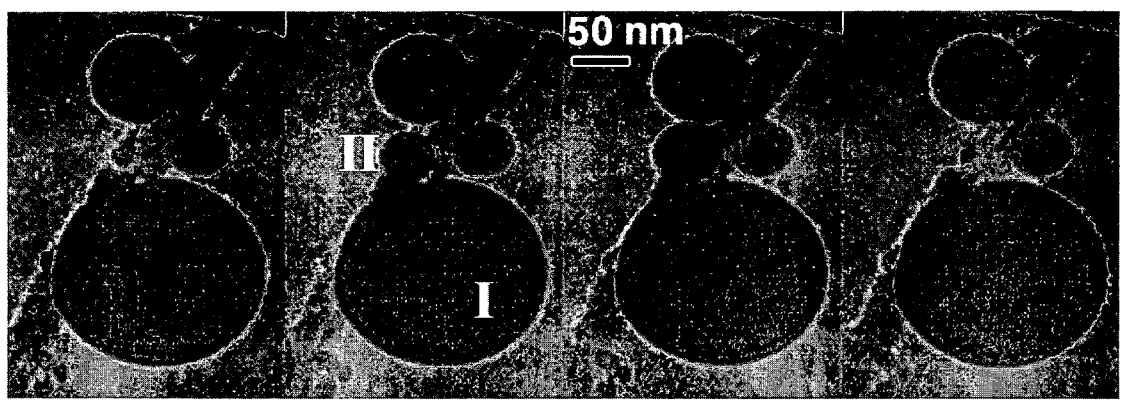
FIG. 3 is a series of electron micrographs showing droplets I and II in the present device growing and shrinking; with respect to the time scale of FIG. 4, the images are taken at time=65 s (first panel); time=85 s (second panel); time=95 s (third panel); and time=96 s (fourth panel)

FIG. 3: Observation of the Device in Operation

FIG. 3 is a time series of four TEM images showing relaxation oscillator operation. The larger droplet maintains a radius of approximately 90-91 nm during oscillation, while the smaller droplet II grows to a radius of about 30 nm before contacting the larger droplet I and then shrinking to essentially zero. An applied voltage of 1.3 V drives 40 μA from bottom to top through the nanotube substrate. As many as four indium droplets are visible, depending on the frame. The other droplets are not noticeably affected because they are in a colder region of the nanotube substrate.

In these images mass is leaving droplet I, causing it to shrink, while the next droplet II grows. Between frames 3 and 4 droplets I and II touch and the oscillator relaxes. While the gradual transport takes place over many seconds as dictated by the control voltage, the reset to the initial condition occurs rapidly compared to the video acquisition rate of 30 frames per second.

Figure 4:
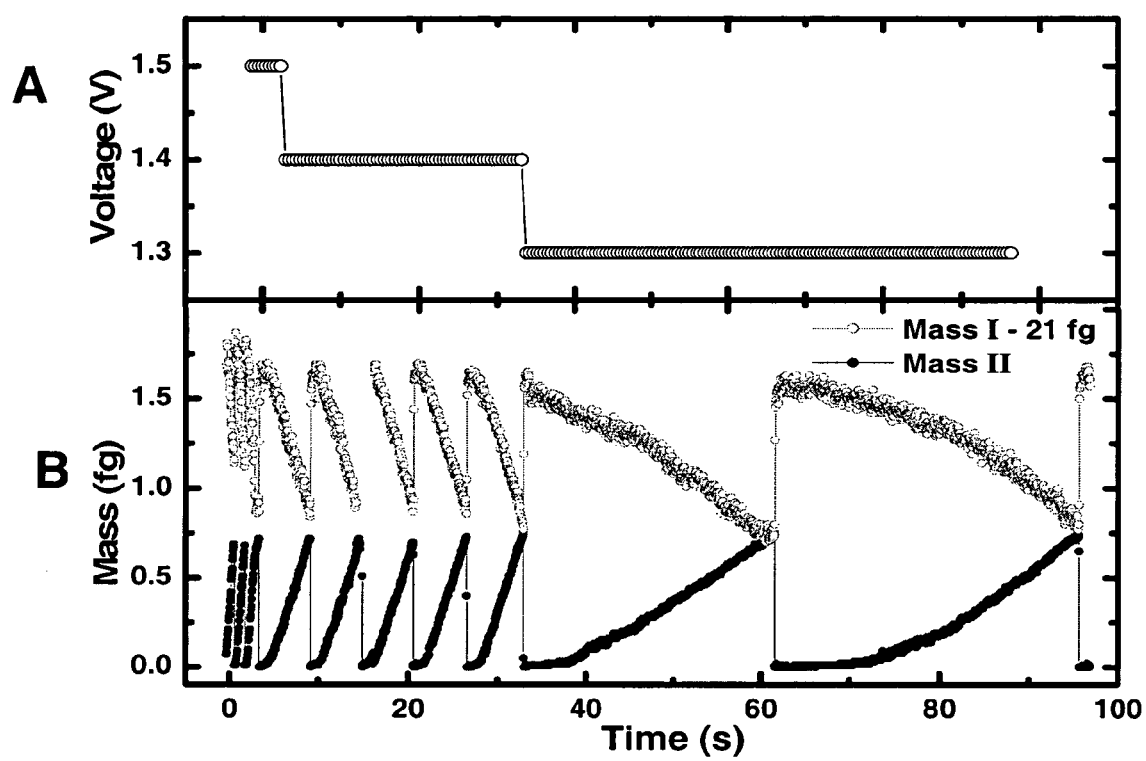
FIG. 4 is a series of graphs showing voltage (A); Mass of droplet I (B); and mass of droplet II (C).

FIG. 4: Electronic Control

The operation of the present device is further illustrated in FIG. 4. The top panel, FIG. 4a, shows voltage as a function of time being held first briefly at +1.5 V, then at +1.4 V (the positive terminal is at the top of FIG. 2), then at +1.3V. In FIG. 4B, tracings of the mass of the particles as a function of time are shown. Particle I (top tracing) is scaled by −21 fg. That is, when the mass is shown on the graph as 21 fg, the mass of the particle in fact was 22 fg (as calculated). Particle II alternates between ~0 and 0.7 fg, while particle I alternates between about 22 fg and 22.7 fg, proportionately gaining mass while particle I loses mass, and vice versa. The cycle time varies with applied voltage. At 1.5V, the cycles are approximately 1.2 second; at 1.4 V, approximately 6 sec.; and at 1.3 V, approximately 30 sec.

The masses in FIG. 4 have been calculated from the cross-sectional areas as determined by an automated image processing routine, assuming that the droplets are spheres (mass=(7 g/cm3)(4π/3)(area/π)3/2). Mass oscillations over many cycles are evident, with the small droplet showing slow growth followed by rapid relaxation. Although it is not immediately apparent in the still images, the automated analysis shows that mass changes in the small droplet are anti-correlated with mass changes in the large, indicating excellent mass conservation within this two-droplet system. Changes in the control voltage lead to immediate changes in the mass transfer rate, and thus the oscillation frequency. TEM video further illustrated the devices operation.

At constant control voltage, there are discernable (~0.6%) drops in the supplied current correlated with the relaxation of the oscillator of FIG. 2. The distribution of the metal on the nanotube substrate is thus affecting the resistance of the complete circuit, which facilitates practical implementations of this oscillator. That is, the current varies slightly with the size of the droplets. When the larger droplet grows, the resistance across the channel drops slightly. With the circuit resistance as a built-in diagnostic of the oscillator phase, the additional complication and expense of an external monitor (in this case, the TEM) could become unnecessary in a well-characterized system. In an integrated device, electronics could conveniently monitor and, for instance, automatically adjust the oscillator frequency with closed-loop feedback. In this case, the oscillation frequency is determined by monitoring the cycles of resistance change across the channel.

The relaxation mechanism liberates appreciable energies in a very brief period. Immediately prior to a relaxation event, the small and large droplets of FIG. 3 have radii of about 30 and 90 nm respectively. After relaxation, the large droplet's radius has increased to 91 nm. The surface tension γ of liquid indium at 400-500° C. is 0.54 N/m (Ref. 18), implying an energy release of 5 fJ per relaxation. In the viscous, small Reynold's number limit appropriate at these length scales, the time scale τ for the coalescence of the two droplets can be estimated(Ref. 19) as τ~Rη/γ, where R is the characteristic drop radius and η is the metal viscosity (indium's viscosity is 1.3 mN s m-2 in the relevant temperature range(Ref. 20)). This time scale, about 200 ps, implies that an oscillator based on this concept might operate at frequencies approaching the gigahertz range, subject of course to the time constraints of the slow phase. The speed of the relaxation event implies correspondingly large peak powers and forces: the oscillator shown in FIG. 3 generates a peak power of ~20 μW, and a peak force ~50 nN. The peak power is about 20 microwatts. Note that this power is pulsed—it is achieved during the relaxation event. The average power depends on the repetition rate, which we can vary by varying the control voltage.

Among the desirable applications of this nanoscale relaxation oscillator are locomotive devices (Ref. 21) as the oscillating metal droplets can exert substantial mechanical forces on neighboring objects.

Reference 21 discloses the design and performance of two prototype microbots which may serve as design templates for use with the present device. These microbots were formed by surface micromachining arrays of 270 micrometer long polycrystalline legs across the surface of a silicon chip. These devices use an electrothermal actuator array. Power is supplied to the microbot through a probe. Solder self-assembly (See discussion of Ref. 8) is used to create portions of the device. Solder assembly of the microbot legs used surface tension from a sphere of indium with a diameter of 37 micrometers. The indium was deposited and the chip was heated to the melting point of indium (160° C.), where the surface tension of the indium lifted the legs into place.

Because the present device operates with a constant DC voltage, it could also be constructed with a small on board battery. Such a battery has been described in the literature. One may make tiny batteries by etching 200×100×2-micron trenches into silicon chips and then filling the trenches with a porous glass electrolyte and lithium and lithium manganese oxide electrodes. Lithium ions move through the glass from one electrode to the other to produce current. One may also add nano-sized pores to the glass. This increases the flow of lithium ions and therefore also increases the power of the battery. A small solar cell could also be used to store and/or deliver power to the oscillator. A solar cell would delver more power per added weight than an on board battery.

We have constructed numerous oscillators of similar design, including configurations where the growing and shrinking of the droplets causes the substrate nanotube to flex. That is, the MWNT that served as the substrate/channel was flexed by the change in size and adhesion of the droplet on the nanotube. Using device geometries demonstrated at the MEMS scale (Ref. 12), we imagine that efficient mechanical coupling to the oscillator could be arranged to provide large angular deflections. Such a nanoelectromechanical actuator promises a powerful combination of speed, simplicity, and strength, incorporating as it would high frequency operation, low-voltage DC electrical drive, and surface tension's advantageous force scaling.

Thus there has been described a preferred embodiment of a relaxation oscillator according to the present invention. The present examples, methods, procedures, specific materials, times and temperatures are meant to exemplify and illustrate the invention and should not be seen as limiting the scope of the invention, which is defined by the appended claims. Any patents or publications mentioned in this specification are indicative of levels of skill in the art and are hereby incorporated by reference to the same extent as if each was specifically and individually incorporated by reference and for the purpose of describing and enabling the method or material referred to. The citation of a publication in the specification is not an admission that such publication is prior art to the present invention.

REFERENCES

1. W. S. N. Trimmer, Sensors and Actuators 19, 267-287 (1989).
2. J. R. Adams, Insect potpourri : adventures in entomology (Sandhill Crane Press, Gainesville, Fla., 1992).
3. D. L. Hu, B. Chan, J. W. M. Bush, Nature 424, 663-666 (2003).
4. T. F. Anderson, Journal of Applied Physics 21, 724-724 (1950).
5. C. H. Mastrangelo, C. H. Hsu, Journal of Microelectromechanical Systems 2, 33-43 (1993).
6. R. Maboudian, R. T. Howe, Journal of Vacuum Science & Technology B 15, 1-20 (1997).
7. C. J. Kim, J. Y. Kim, B. Sridharan, Sensors and Actuators A-Physical 64, 17-26 (1998).
8. J. Lee, C. J. Kim, Journal of Microelectromechanical Systems 9, 171-180 (2000).
9. S. K. Cho, H. J. Moon, C. J. Kim, Journal of Microelectromechanical Systems 12, 70-80 (2003).
10. N. R. Tas, J. W. Berenschot, T. S. J. Lammerink, M. Elwenspoek, A. van den Berg, Analytical Chemistry 74, 2224-2227 (2002).
11. F. G. Tseng, C. J. Kim, C. M. Ho, Journal of Microelectromechanical Systems 11, 427-436 (2002).
12. R. R. A. Syms, E. M. Yeatman, V. M. Bright, G. M. Whitesides, Journal of Microelectromechanical Systems 12, 387-417 (2003).
13. B. van der Pol, J. van der Mark, Philosophical Magazine 6, 763-775 (1928).
14. A. Dinnocenzo, L. Renna, Physical Review E 55, 6776-6790 (1997).
15. M. V. Matthews, W. L. Ellsworth, P. A. Reasenberg, Bulletin of the Seismological Society of America 92, 2233-2250 (2002).
16. B. C. Regan, S. Aloni, R. O. Ritchie, U. Dahmen, A. Zettl, Nature 428, 924-927 (2004).
17. A. W. Adamson, A. P. Gast, Physical chemistry of surfaces (Wiley, N.Y., ed. 6th, 1997).
18. M. A. McClelland, J. S. Sze, Surface Science 330, 313-322 (1995).
19. J. Eggers, J. R. Lister, H. A. Stone, Journal of Fluid Mechanics 401, 293-310 (1999).
20. S. J. Cheng, X. F. Bian, J. X. Zhang, X. B. Qin, Z. H. Wang, Materials Letters 57, 4191-4195 (2003).
21. P. E. Kladitis, V. M. Bright, Sensors and Actuators A-Physical 80, 132-137 (2000).

What is claimed is:

1. A nanoscale oscillation device, comprising:
   (a) an atomically smooth channel for supporting a first particle and a second, smaller particle and for delivering atoms between particles;
   (b) said first particle and said second particle being made of a chargeable material; wherein the particles are spaced apart for mass transport in response to a potential gradient, and the first and second particles are fluid and touch at a predetermined point of mass transport, thereby causing merging of the second particle into the first particle by surface tension; and
   (c) said delivering and merging causing an oscillating change in particle size.

2. The device of claim 1 further comprising an actuator for contacting a particle and transmitting its oscillation.

3. The device of claim 1 wherein the channel comprises a carbon nanotube.

4. The device of claim 3 wherein the carbon nanotube is an MWNT.

5. The device of claim 4 wherein the particles are each never more than 500 nm in diameter.

6. The device of claim 1 wherein the particles comprise a metal.

7. The device of claim 6 wherein the metal is indium, thallium, gallium, tin, titanium, lead, mercury, gold, silver, aluminum, platinum, copper, or a mixture of one or more of these.

8. The device of claim 1 wherein the channel has a length between 10 micron and 10 nanometers and a diameter between 0.5 nm and 100 nm.

9. The device of claim 1 further comprising an electrical source connected to electrodes on the channel, wherein the electrical source is a selected from the group consisting of a voltage source, a current source and a combination thereof.

10. The device of claim 9 wherein the voltage source delivers between 0.1 and 5 volts.

11. The device of claim 1 further comprising electrodes connected to the channel.

12. The device of claim 11 further comprising a voltage source delivering a fixed voltage.

13. The device of claim 1 wherein the particles are spaced apart a distance between 10 and 200 nm.

14. The device of claim 1 further comprising an actuator contacting a particle for transmitting oscillations in size of the particle.

15. The device of claim 14 wherein the actuator is selected from the group consisting of a nanoscale structure, electromagnetic radiation, and sound waves.

16. The device of claim 15 wherein the nanoscale structure is selected from the group consisting of: hinged silicon, a nanotube, a nanowire, an insulating material, a semiconductor material, a metal material, a silicon material, a silicon nitride material and a gallium arsenide material.

17. The device of claim 14 wherein the particles are each never more than 500 nm in diameter.

18. The device of claim 17 wherein the particles comprise a metal.

19. The device of claim 18 wherein the metal is indium, thallium, gallium, tin, titanium, lead, mercury, gold, silver, aluminum, platinum, copper, or a mixture of one or more of these.

20. The device of claim 14 wherein the channel has a length between 10 micron and 10 nanometers and a diameter between 0.5 nm and 100 nm and the particles comprise a metal.

21. A method for producing nanoscale mechanical oscillation, comprising:
(a) forming an atomically smooth channel having thereon a first particle and a second particle, both of a chargeable material, said channel having a uniform surface for delivering atoms between particles; and
(b) delivering a non-reversing potential traversing the first and second particles;
whereby the particles change in a slow phase where one particle grows and the other shrinks; and a fast phase where the growing particle, through surface tension shrinks.

22. The method of claim 21 further comprising the step of: contacting a particle with an actuator responsive to mechanical oscillation of the size of the particle.

23. The method of claim 21, further comprising the step of delivering a constant voltage of less than 5 volts across the channel member to provide the potential gradient.

24. The method of claim 21 wherein the oscillation occurs in periods of less than 1 millisecond.

25. The method of claim 24 wherein the oscillation occurs in periods of less than 1 nanosecond.

26. The method of claim 21 wherein the fast phase is at least 100 times shorter than the slow phase.

27. The method of claim 26 wherein the fast phase repeats at least one million times per second.

28. The method of claim 21 further comprising the step of heating the channel to liquefy the particles.

29. A method of making a nanoscale mechanical oscillation device, comprising:
(a) providing a channel member having a uniform particle transport surface;
(b) applying to the channel member a first particle and a second particle, both particles being made of a chargeable material and a specified distance apart on the transport surface; and
(c) providing connections for delivering a potential gradient across the first and second particles, whereby,
the particles shrink and grow in an oscillatory manner in response to the potential gradient.

30. The method of claim 29, further comprising the step of: applying an actuator to a particle for movement in response to changes in size of a particle.

31. The method of claim 29 wherein the connections deliver a potential gradient selected from a voltage gradient, a chemical gradient, a magnetic gradient, and a thermal gradient.

32. The method of claim 31 wherein the connections are electrodes for delivering a voltage gradient.

* * * * *